(12) United States Patent
Kiyohara et al.

(10) Patent No.: US 8,015,269 B2
(45) Date of Patent: Sep. 6, 2011

(54) NODE DEVICE, SHARED INFORMATION UPDATE PROCESSING PROGRAM, SHARED INFORMATION UPDATE METHOD, AND INFORMATION SHARING SYSTEM

(75) Inventors: Yuji Kiyohara, Nagoya (JP); Koichi Iijima, Higashikurume (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 326 days.

(21) Appl. No.: 12/068,331

(22) Filed: Feb. 5, 2008

(65) Prior Publication Data
US 2008/0172478 A1 Jul. 17, 2008

Related U.S. Application Data

(63) Continuation-in-part of application No. PCT/JP2006/310350, filed on May 24, 2006.

(30) Foreign Application Priority Data

Aug. 22, 2005 (JP) ................. 2005-239532

(51) Int. Cl.
G06F 15/16 (2006.01)
G06F 15/177 (2006.01)
G06F 9/44 (2006.01)

(52) U.S. Cl. ........ 709/220; 709/218; 709/230; 717/168; 717/170

(58) Field of Classification Search .......... 709/218, 709/220, 230; 717/168, 170
See application file for complete search history.

(56) References Cited

U.S. PATENT DOCUMENTS

| 6,289,510 | B1 * | 9/2001 | Nakajima | 717/170 |
|---|---|---|---|---|
| 6,317,754 | B1 | 11/2001 | Peng | |
| 6,421,671 | B1 * | 7/2002 | Bryan et al. | 1/1 |
| 7,203,708 | B2 * | 4/2007 | Liu et al. | 1/1 |
| 7,360,208 | B2 * | 4/2008 | Joshi et al. | 717/168 |
| 7,383,289 | B2 * | 6/2008 | Kraft | 1/1 |
| 7,480,907 | B1 * | 1/2009 | Marolia et al. | 717/174 |

(Continued)

FOREIGN PATENT DOCUMENTS

JP   A 2000-057032   2/2000

(Continued)

OTHER PUBLICATIONS

Kangasharju J. et al., "Locating Copies of Objects Using the Domain Name System," 1999, Proceedings of the International Caching Workshop, Section 3.2.

(Continued)

*Primary Examiner* — Ario Etienne
*Assistant Examiner* — Ho Shiu
(74) *Attorney, Agent, or Firm* — Oliff & Berridge, PLLC

(57) ABSTRACT

The present invention is to provide a node device, a shared information update processing program, a shared information update means, and an information sharing system, which can quickly and assuredly update the shared information in each of the node devices without applying an excessive load to a specific apparatus such as a server.
According to the present invention, there is provided a plurality of node devices mutually connectable through a network, each of the node devices saving shared information, used in common with the nodes, and in a case where each of the node devices transmits predetermined data to the node device, being a connection counterpart, the node device describing version information indicative of a version of the shared information, saved by the own node device, including: a data receiving means; a version judgment means; and a shared information update means.

13 Claims, 10 Drawing Sheets

U.S. PATENT DOCUMENTS

| | | | |
|---|---|---|---|
| 7,546,595 B1* | 6/2009 | Wickham et al. | 717/168 |
| 2002/0062336 A1 | 5/2002 | Teodosiu et al. | |
| 2003/0120685 A1* | 6/2003 | Duncombe et al. | 707/200 |
| 2003/0131025 A1* | 7/2003 | Zondervan et al. | 707/200 |
| 2003/0163702 A1 | 8/2003 | Vigue et al. | |
| 2003/0221190 A1* | 11/2003 | Deshpande et al. | 717/171 |
| 2004/0015942 A1* | 1/2004 | Branson et al. | 717/168 |
| 2004/0107242 A1 | 6/2004 | Vert et al. | |
| 2004/0196762 A1* | 10/2004 | Osakabe | 369/47.53 |
| 2005/0076098 A1 | 4/2005 | Matsubara et al. | |
| 2005/0132349 A1* | 6/2005 | Roberts et al. | 717/168 |
| 2005/0193245 A1* | 9/2005 | Hayden et al. | 714/13 |
| 2006/0025123 A1* | 2/2006 | Majmundar et al. | 455/419 |
| 2006/0259604 A1* | 11/2006 | Kotchavi et al. | 709/223 |
| 2007/0088733 A1* | 4/2007 | Bodge et al. | 707/102 |
| 2007/0214472 A1* | 9/2007 | Kim et al. | 725/28 |
| 2009/0172177 A1* | 7/2009 | Lu | 709/230 |

FOREIGN PATENT DOCUMENTS

| | | |
|---|---|---|
| JP | A 2003-016036 | 1/2003 |
| JP | A 2003-288254 | 10/2003 |
| JP | A 2004-185618 | 7/2004 |
| JP | A 2004-524602 | 8/2004 |
| JP | A 2005-051351 | 2/2005 |
| JP | A 2005-115943 | 4/2005 |

OTHER PUBLICATIONS

Tsukada H. et al., "A File Synchronization System for Cooperating Work via the Internet," 2005, Information Processing Society of Japan Kenkyu Hokoku, vol. 2005, No. 79, pp. 33-40.

Oka T. et al., "Lightweight Load Balancing for Distributed Hash Tables," Technical Report of IEICE by The Institute of Electronics, Information and Communication Engineers, Feb. 5, 2004.

Sep. 21, 2010 Office Action issued in Japanese Patent Application No. 2005-239532 (with translation).

* cited by examiner

FIG. 2

ROUTING TABLE OF DHT OF PARTICIPANT NODE n1

| | 0XX AREA<br>NODE ID:002 | 1XX AREA<br>NODE ID:122 | 2XX AREA<br>NODE ID:221 | 3XX AREA<br>NODE ID:301 |
|---|---|---|---|---|
| LEVEL 1 | IP ADDRESS AND PORT NUMBER OF PARTICIPANT NODE n15 | IP ADDRESS AND PORT NUMBER OF PARTICIPANT NODE n1 | IP ADDRESS AND PORT NUMBER OF PARTICIPANT NODE n4 | IP ADDRESS AND PORT NUMBER OF PARTICIPANT NODE n11 |
| | 10X AREA<br>NODE ID:102 | 11X AREA<br>NODE ID:112 | 12X AREA<br>NODE ID:122 | 13X AREA<br>NODE ID:131 |
| LEVEL 2 | IP ADDRESS AND PORT NUMBER OF PARTICIPANT NODE n8 | IP ADDRESS AND PORT NUMBER OF PARTICIPANT NODE n13 | IP ADDRESS AND PORT NUMBER OF PARTICIPANT NODE n1 | IP ADDRESS AND PORT NUMBER OF PARTICIPANT NODE n10 |
| | NODE ID:120 | NODE ID:121 | NODE ID:122 | |
| LEVEL 3 | IP ADDRESS AND PORT NUMBER OF PARTICIPANT NODE n12 | IP ADDRESS AND PORT NUMBER OF PARTICIPANT NODE n6 | IP ADDRESS AND PORT NUMBER OF PARTICIPANT NODE n1 | (UNREGISTERED) |

NODE ID SPACE OF DHT

NODE ID SPACE OF DHT

FIG. 6

EXAMPLE OF CONTENT OF CONTENT LOCATION INQUIRY MESSAGE

| | | | |
|---|---|---|---|
| MESSAGE HEADER | IP ADDRESS AND PORT NUMBER OF TRANSMITTER | 234.123.123.0 : 20000 | 52b |
| | NODE ID OF TRANSMITTER | 55637845968775210 | |
| | VERSION NUMBER OF TRANSMITTER | FW-1025 | |
| | INTERNET ENVIRONMENT EVALUATION VALUE | B | |
| | IP ADDRESS AND PORT NUMBER OF TRANSMITTER | 123.234.100.0 : 20001 | 52c |
| | NODE ID OF TRANSMITTER | 55637845968775210 | |
| | VERSION NUMBER OF TRANSMITTER | FW-1025 | |
| | INTERNET ENVIRONMENT EVALUATION VALUE | E | |
| | IP ADDRESS AND PORT NUMBER OF TRANSMITTER | 222.234.100.55 : 20001 | 52d |
| | NODE ID OF TRANSMITTER | 55637845968775210 | |
| | VERSION NUMBER OF TRANSMITTER | FW-1025 | |
| | INTERNET ENVIRONMENT EVALUATION VALUE | A | |
| | IP ADDRESS AND PORT NUMBER OF TRANSMITTER | 123.0.0.123 : 20001 | 52e |
| | NODE ID OF TRANSMITTER | 55637845968775210 | |
| | VERSION NUMBER OF TRANSMITTER | FW-1024 | |
| | INTERNET ENVIRONMENT EVALUATION VALUE | C | |
| | IP ADDRESS AND PORT NUMBER OF TRANSMITTER | 234.100.100.234 : 20001 | 52f |
| | NODE ID OF TRANSMITTER | 55637845968775210 | |
| | VERSION NUMBER OF TRANSMITTER | FW-1025 | |
| | INTERNET ENVIRONMENT EVALUATION VALUE | D | |
| | TRANSFERRED TIMES | 4 | 52g |
| | MESSAGE TYPE | CONTENT LOCATION INQUIRY MESSAGE | 52h |
| MESSAGE MAIN BODY | CONTENT ID | 89540002125879930 | |
| | REPLY REQUEST NUMBER | 5 | |

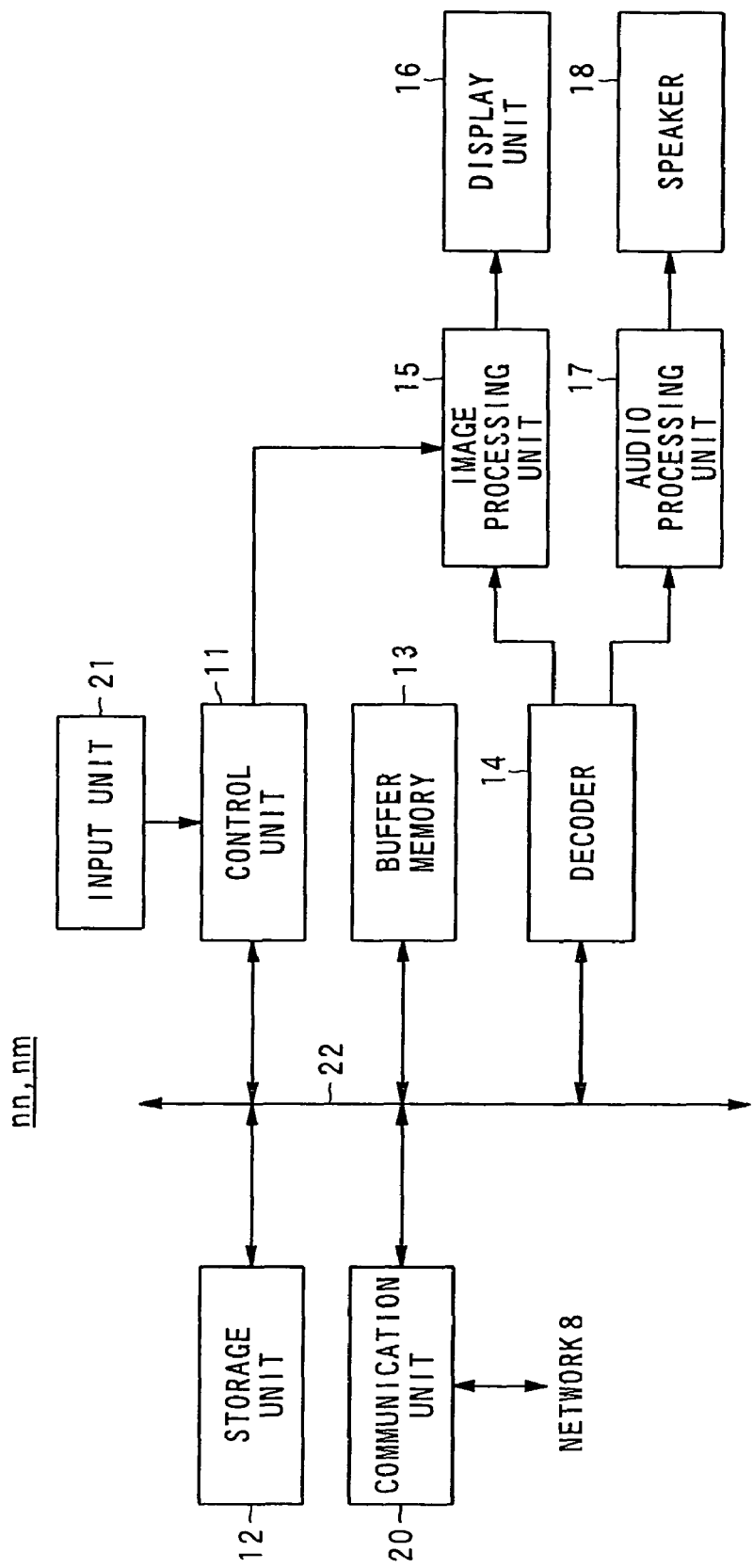

NODE DEVICE, SHARED INFORMATION UPDATE PROCESSING PROGRAM, SHARED INFORMATION UPDATE METHOD, AND INFORMATION SHARING SYSTEM

This is a Continuation-in-Part of National Phase Application No. PCT/JP2006/310350 filed May 24, 2006. The disclosure of the prior application is hereby incorporated by reference herein in its entirety.

BACKGROUND OF THE INVENTION

1. Field of the Invention

The present invention relates to a peer to peer (P2P) information sharing system including a plurality of node devices, which are connected each other via a network, particularly relates to a technical field for updating shared information memorized respectively in the node devices.

2. Discussion of Related Art

In such a peer to peer information delivery system, as disclosed in Non Patent Document 1, for example, an overlay network is logically configured by use of a distributed hash table (hereinafter referred to as DHT). Each of node devices which participate in the overlay network does not recognize link information (for example, IP address) of all the node devices, but retains only part of link information, which is obtained on participation or the like, and data inquiry or the like is carried out on the basis of such the link information.

Non Patent Document 1: Lightweight Load Balancing for Distributed Hash Tables, TECHNICAL REPORT OF IEICE by THE INSTITUTE OF ELECTRONICS, INFORMATION AND COMMUNICATION ENGINEERS

SUMMARY OF THE INVENTION

However, in such the information sharing system of the peer to peer type, when shared information used in common with a firmware, an application software, various setup files and so on, which are respectively memorized in the node devices, is updated (version-up or update), it can be said a method of securing reliability most is, for example, to distribute a dedicated message of prompting update from a predetermined server, to notify the node devices of an event that there is the update, and to thereby cause each of the node devices download newest shared information from an administration server which administrates the shared information.

However, if a node device is not participated in an overlay network (i.e. withdrawn) because of certain reasons (e.g. a power-off or a logout by a user, an electric power failure, a malfunction, and a failure in network) when the dedicated message to prompt the update is transmitted, there is a problem that the node device does not recognize the necessity for updating shared information until a dedicated message to prompt the update is transmitted to the node device again.

Further, because each node device downloads shared information by connecting to the management server, there is a problem that excessive loads are applied to the management server due to concentration of access.

The present invention is made in consideration of the above problems, and the object of the present invention is to provide a node device, a shared information update process program, a shared information update method, and an information sharing system which can quickly and assuredly update shared information in each node device without applying excessive loads to a specific device such as a server.

To solve the above-mentioned problems, according to one aspect of the present invention, there is provided a node device in an information sharing system, the system including a plurality of node devices mutually connectable through a network, each of the node devices saving shared information which is used in common, and when each of the node device transmits predetermined data to a node device, being a connection counterpart, the node device describes in the data version information indicative of a version of the shared information saved by the own node device, the node device including: a data receiving means for receiving data transmitted from the connection counterpart, in which the version information is described; a version judgment means for judging at least whether or not the version of the shared information saved by the own node device is older than version of shared information, saved by other node device by comparing the version information described in the data thus received with the version information of shared information saved by the own node device; and a shared information update means for obtaining the shared information from the other node saving shared information of a newer version than the version of the shared information saved by the own node device and updating the shared information saved by the own node device when it is judged that the version of shared information saved by the own node device is older.

According to the present invention, when each node device transmits predetermined data to a node device which is a connection counterpart, version information indicating a version of shared information saved by the own node is described in the data, and thus transmitted. The data in which the transmitted version information is described are received, version information described in the data and version information of shared information saved by the own node device are compared, it is judged at least whether or not the version of the shared information saved by the own node device is older than the version of shared information, saved by other node device. In a case where it is judged that the version of the shared information, saved by the own node device, is older, the shared information is acquired from the other node device saving a version newer than the version of the shared information saved by the own node device to update shared information, saved by the own node device. Therefore, even in a peer-to-peer type information sharing system, it is possible to quickly and assuredly update shared information in each node device without applying excessive loads to a specific device such as a server.

BRIEF DESCRIPTION OF THE DRAWINGS

FIG. 2 is a view showing an example of a routing table of DHT retained by a participant node n1.

FIG. 6 is a view showing an example of content of a content location inquiry message.

FIG. 7 is a view showing a schematic configuration of a participant node nn and a non-participant node nm.

DETAILED DESCRIPTION OF THE PREFERRED EMBODIMENT

Figure 1:
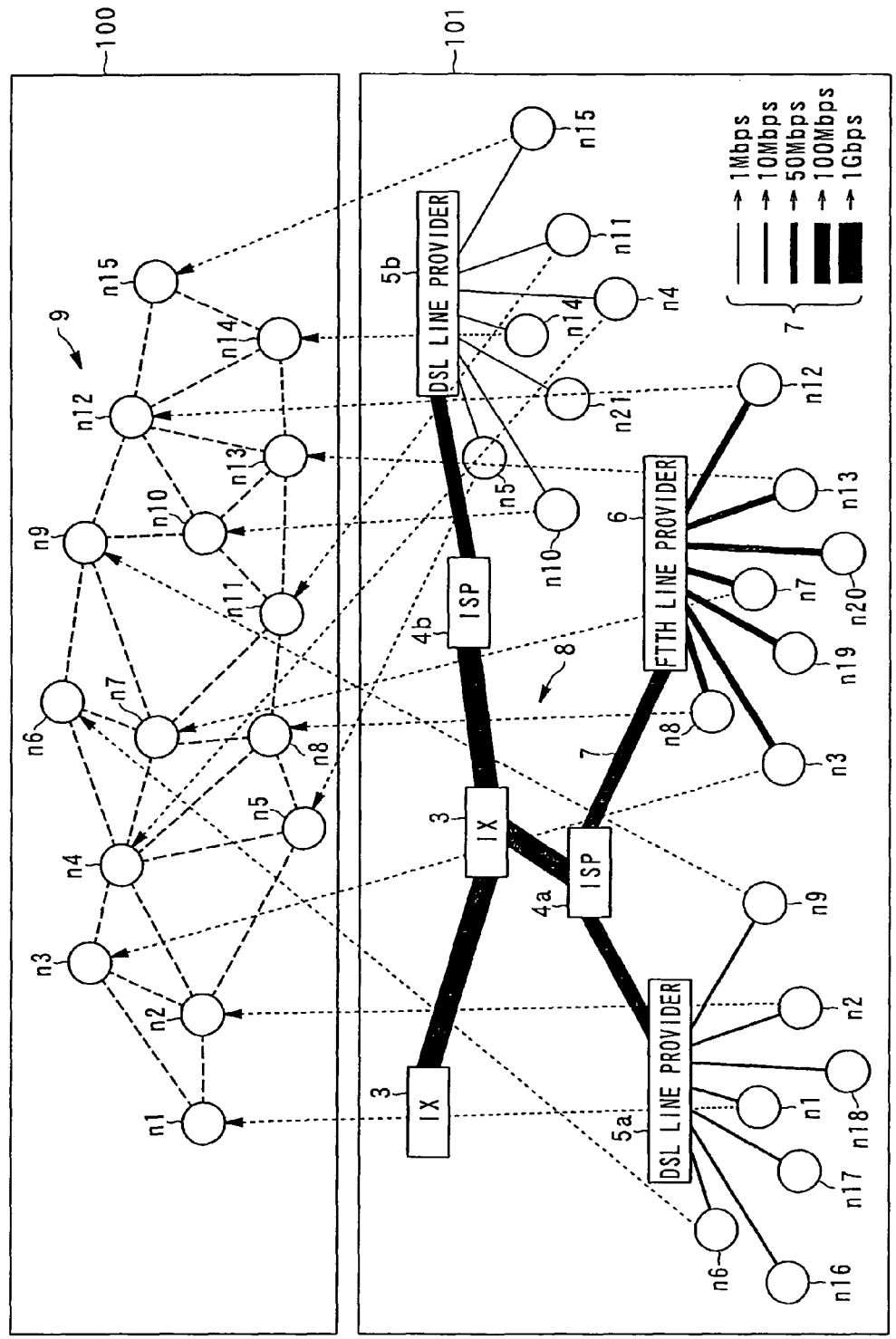
FIG. 1 is a view showing an example of connection status of each node device in a content delivery system according to the present embodiment.

Hereafter, best embodiments of the present invention will be explained on the basis of figures. The embodiments explained below are embodiments in a case where the present invention is applied to a content delivery system.

Hereinafter, each designation of numerical reference in the drawings is typically as follows: 8: network; 9: overlay network; 11: control unit; 12: storage unit; 13: buffer memory; 14: decoder; 15: image processing unit; 16: display unit; 17: audio processing unit; 18: speaker; 20: communication unit; 21: input unit; 22: bus; and S: content delivery system

[1. Configuration and the Like of Content Delivery System]

First of all, with reference to FIG. 1, schematic configuration and the like of a content delivery system will be explained.

FIG. 1 is a diagram showing an example of connection status of each node device in a content delivery system according to the present embodiment.

As shown in a lower rectangular frame 101 in FIG. 1, a network 8 (communication network in real world) of the Internet or the like is constructed by an internet exchange (IX) 3, internet service providers (ISP) 4a and 4b, digital subscriber line providers (or device thereof) 5a and 5b, fiber to home line provider ('s device) 6, and communication line (for example, such as a telephone line or an optical cable) 7 and the like. Here, in the network 8 (communication network) in the example of FIG. 1, a router for transferring data (packet) is appropriately inserted (not shown).

A content delivery system S is constructed by a plurality of node devices n1, n2, . . . n21 which are connected with each other via such network 8 and is a peer-to-peer network system (in a practical use, there are more node devices in the system). Further, to each of the node devices n1, n2 . . . n21, unique manufacturing number and internet protocol (IP) address (global IP address) have been assigned respectively. Here, none of manufacturing number and IP address overlaps in a plurality of node devices.

In this content delivery system S, an overlay network 9 shown in the upper rectangular frame 100 of FIG. 1 is constructed by a specific algorithm, for example, using a DHT. In other words, the overlay network 9 means a network which configures a virtual network (logical network) formed by using an existing network 8.

In the present embodiment, there is a premise that an overlay network 9 is configured by an algorithm using DHT and node devices n1 to n15 provided on this overlay network 9 are referred to as node devices participating in the overlay network 9 (inside upper rectangular 100 in FIG. 1) (hereinafter, such node devices n1 to n15 are generally referred to as participant node nn). In other words, the overlay network 9 is formed by participation of the participant node device nn. Participation into such an overlay network 9 is carried out when node devices n16 to n21 which have not participated yet (hereinafter generally referred to as non-participant node nm) send a participation request to any arbitrary node device nn which has already participated in.

Further, each of the participant node nn has a node ID as unique identification information. The node ID is a hashed value obtained by hashing a unique number of each node device such as an IP address or manufacturing number (for example, bit length is 160 bit) by a shared hash function (for example, SHA-1 or the like) and is distributed and located in one ID space without deviation.

As such, each of the (hashed) node IDs obtained by a shared hash function in such a manner has a very low possibility of having the same values when the IP address or the manufacturing number differs from each other. Since a known hash function is used, detailed explanation thereof is omitted.

Further, each of participant nodes nn has a DHT. The DHT regulates transfer destination of information on an overlay network. Specifically, the DHT of a participant node nn includes a routing table (transfer destination table) in which a plurality of combination of a node ID and IP address, port number, or the like of another participant node nn, being appropriately apart from the participant node nn, are registered.

Figure 3:
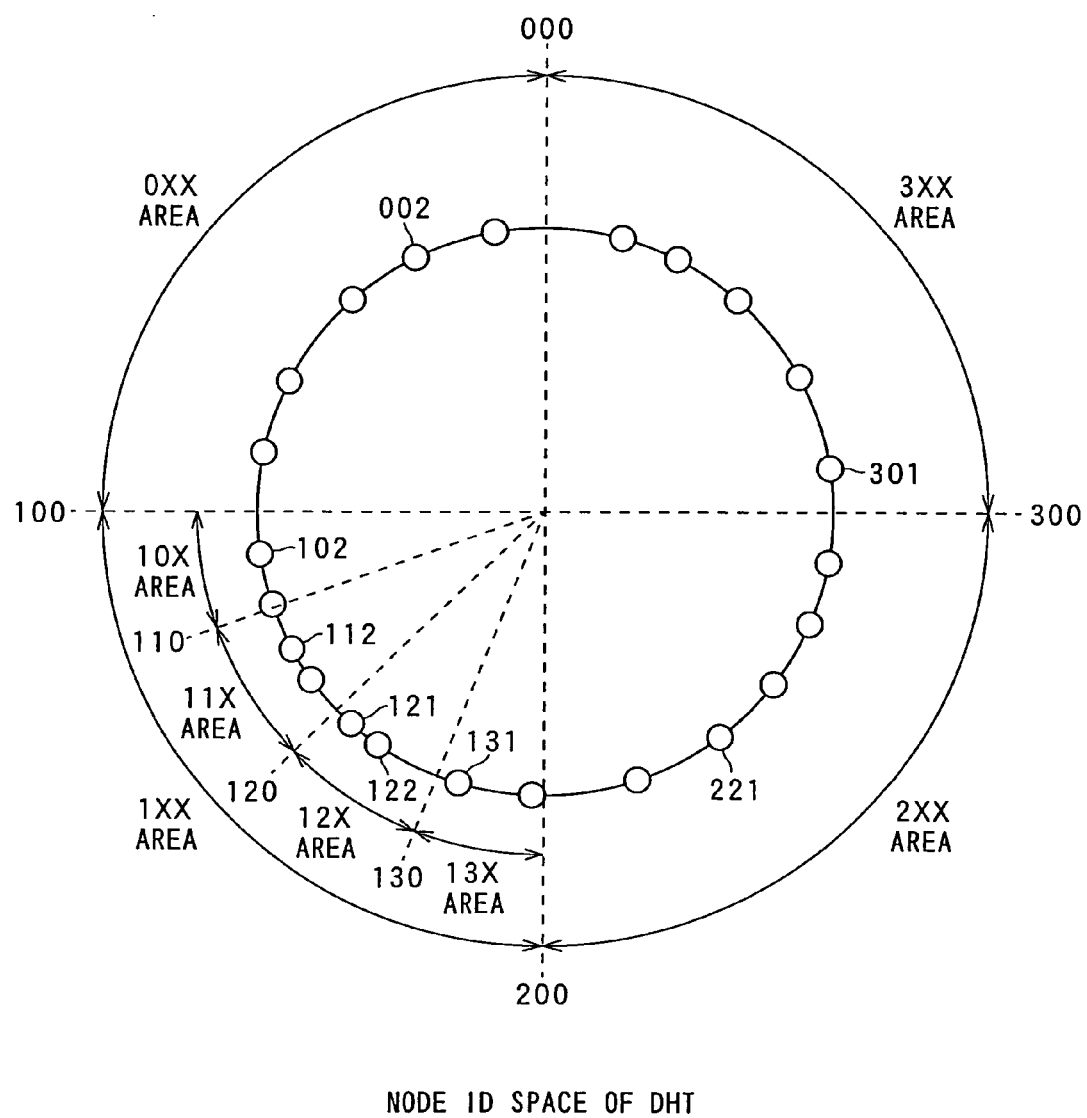
FIG. 3 is a conceptual diagram showing an example of a node ID space of a DHT.

FIG. 2 is a view showing an example of a routing table of the DHT retained by the participant node n1. FIG. 3 is a conceptual diagram showing an example of a node ID space of the DHT.

Here, in the examples of FIGS. 2 and 3, for the convenience of explanation, a bit length of a node ID is set to be 2 bit×3 digits=6 bit and each digit is expressed by quaternary number (in a practical use, a longer bit length is used and each digit is divided into, for example, 4 bit and expressed by hexadecimal of 0 to f).

In the example of FIG. 2, the routing table of the DHT includes tables of levels 1 to 3 (classified into a plurality of levels). In a table entry of each level, node IDs and IP addresses and port numbers of participant nodes nn corresponding to the node IDs are associated and registered. Each area of a table in each level is an area obtained by dividing a node ID space of the DHT. For example, as shown in FIG. 3, in level 1, a node ID space of the DHT in its entirety is divided into four and an area where node IDs "000" to "033" exist is designated as a 0XX area, an area where node IDs "100" to "133" exist is designated as a 1XX area, an area where node IDs "200" to "233" exist is designated as a 2XX area, and an area where node IDs "300" to "333" exist is designated as a 3XX area. Further, in level 2, areas in level 1 (that is, areas "0XX" to "3XX") are further divided into four. For example, 1XX area is divided into four and an area where node IDs "100" to "103" exist is designated as a 10X area, an area where node IDs "110" to "113" exist is designated as a 11X area, an area where node IDs "120" to "123" exist is designated as a 12X area, and an area where node IDs "130" to "133" exist is designated as a 13X area.

Then, for example, provided that a node ID of the participant node n1 is "122", as shown in FIG. 2, the IP address and the like of the own participant node n1 (because IP address belongs to the node n1, registration of the IP address in the routing table is not required) are registered in a table entry of such participant node n1 in 1XX area (where the participant node n1 exists) in level 1, the node ID, and node IDs, IP addresses and the like of other arbitrary participant nodes nn are registered in areas where the node n1 does not exist (in other words, 0XX, 2XX, and 3XX areas).

Further, in the table of such participant node n1 in 12X area (an area where the node n1 exists) in level 2, as shown in FIG. 2, node ID and IP address of the own participant node n1 (because IP address belongs to the node n1, registration of the IP address in the routing table is not required) are registered and in areas where the node n1 does not exist (in other words, 10X, 11X, and 13X areas), node IDs and IP addresses of other arbitrary participant nodes nn are registered.

Further, in level 3 of such participant node n1, node IDs which are between "120" and "122", IP addresses, and the like (because IP address belongs to the node n1, registration of the IP address in the routing table is not required) are registered, as shown in FIG. 2.

In the examples of FIGS. 2 and 3, since bit length of node ID is set up to be three digits×2 bit, a table having three levels can cover everything. However, when bit length of a node ID increases, more table is required as many as the incremental value (e.g. when bit length of a node ID is set up to be 16 digits×4 bit, a table for 16 levels is required).

As described above, in a routing table of DHT according to the present embodiment, the higher the level becomes, the narrower the area becomes.

Such a DHT is given when a non-participant node nm participates in the overlay network 9.

Figure 4:
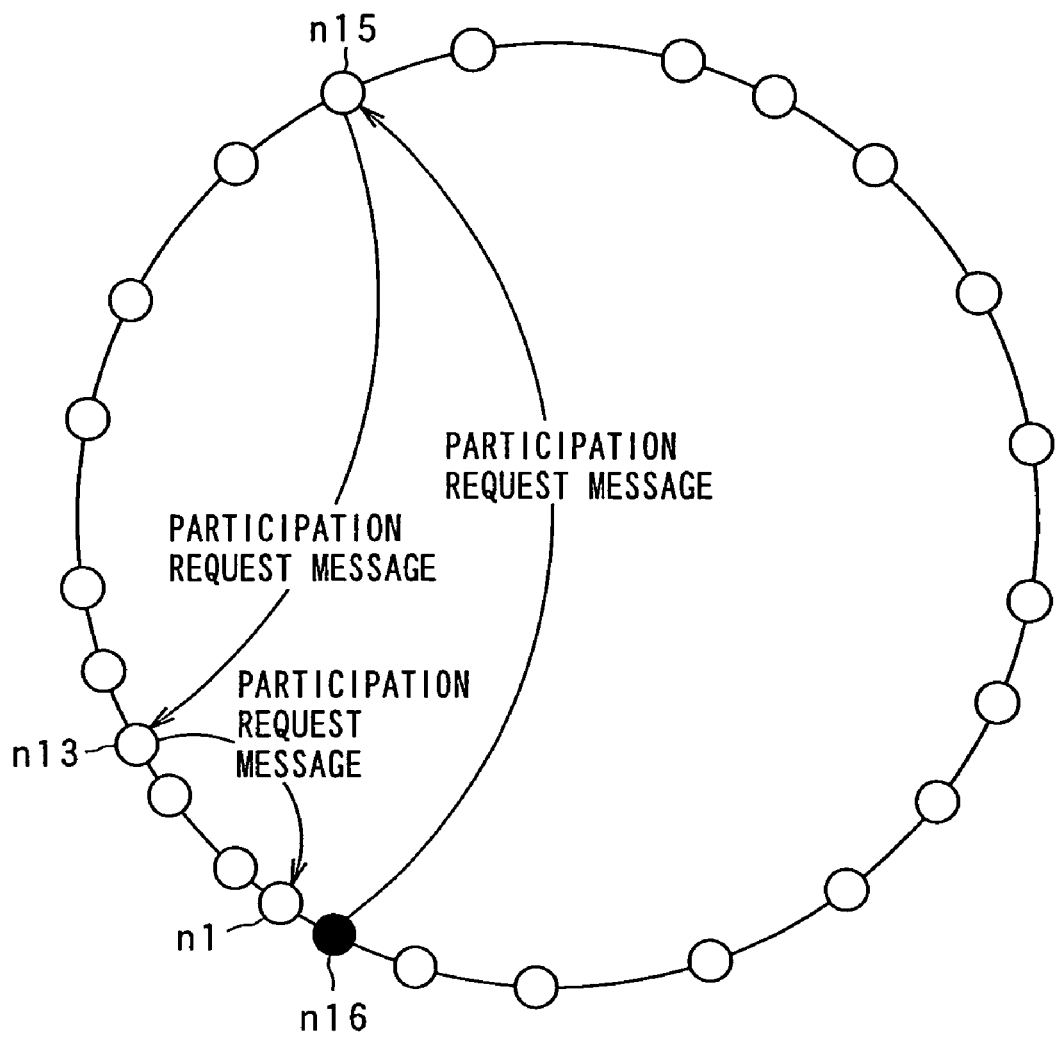
FIG. 4 is a conceptual diagram showing an example of a flow of a participation request message in the node ID space of a DHT when a non-participant node participates in an overlay network 9.

FIG. 4 is a conceptual diagram showing an example of a flow of a participation request message in the node ID space of a DHT when a non-participant node participates in an overlay network 9.

In the example shown in FIG. 4, for example, a non-participant node 16 hashes an IP address of the own node 16 by the hash function to thereby generate a node ID (for example, "123") and transmits a participation request message, in which the node ID, the IP address, and the port number of the own non-participant node n16 are described, to the participant node n15. Then, the participant node n15 receives the participation request message, refers to a routing table of level 1 of a DHT of the own participant node n15, acquires the IP address and port number of a participant node, for example, n13 having a node ID which is closest (for example, upper digits match the most) to the node ID described in the participation request message, and transfers the participation request message to the IP address and the port number (in other words, to the participant node n13). Further, the participant node n15 associates the IP address and the port number with the node ID of the non-participant node n16 and registers in the table of level 1 of the DHT of the own participant node n15 when the node ID can be registered.

On the other hand, the participant node n13 receives the participation request message, refers to a routing table of level 2 of a DHT of the own participant node n13, acquires the IP address and port number of the participant node n1 having a node ID which is closest to the node ID of the non-participant node n16, and transfers the participation request message to the IP address and the port number (in other words, to the participant node n1). Further, the participant node n13 associates the IP address and the port number with the node ID of the non-participant node n16 and registers in the table of level 2 of the DHT of the participant node n13 when the node ID can be registered.

On the other hand, the participant node n1 receives the participation request message, refers to a table of level 3 of a DHT of the own participant node n1, and recognizes that a node ID closest to the node ID of the non-participant node n16 is that of the own participant node n1. Therefore, the message is not transferred any more. Further, the participant node n1 associates the IP address and the port number with the node ID of the non-participant node n16 and registers in the table of level 3 of the DHT of the own participant node n1 (for example, an "unregistered" area in FIG. 2).

In the above-mentioned flow, each of the participant nodes n15, n13, and n1 receiving the participation request message transmits a participation reply information including a part of a routing table of DHT (the participant node n15 transmits part of a table in level 1, the participant node n13 transmits part of a table in level 2, and the participant node n1 transmits part of a table in level 3) to the non-participant node n16.

On the other hand, the non-participant node n16 receives the participation reply message including routing tables of each DHT thus transmitted and based on each routing table included in the participation reply message, generates a routing table of a DHT to be used by the non-participant node n16 (for example, a table of level 1 of the participant node n15 is set up to be a table of level 1 of the own non-participant node n16, a table of level 2 of a participant node n13 is set up to be a table of level 2 of the non-participant node n16, and a table of level 3 of the participant node n1 is set up to be a table of level 3 of the non-participant node n16).

Here, each of participant nodes nn may return a table of all levels from any participant nodes nn (that is, entire routing table) instead of returning tables of different levels and a non-participant node nm may appropriately select a table entry to form a new table.

The non-participant node n16 which obtained the routing table of DHT thus generated participates in the overlay network 9 as a participant node n16 and the participant node n16 notifies content data saved by the own participant node n16. Therefore, a publish message in which a content ID of the content (to be mentioned later) is described is transmitted according to the routing table of the DHT.

Here, the above-mentioned flow is not limited to a case where the non-participant node n16 newly participates in the overlay network 9 but can also be applied to a case where the node withdraws once from the network (for example, by transmitting a withdrawal message to the participant node n1 which manages the node) and participates in the network again.

Further, because participation of a non-participant node nm into the overlay network 9 or withdrawal of a participant node nm from the overpay network 9 frequently occurs in the content deliver system S, it is periodically (for example, with an interval of several tens of minutes to several hours) confirmed whether or not update of a DHT is required (for example, survival confirmation message), and the update information is simultaneously transmitted to another participant node nn in compliance with the routing table of the DHT. Thus, it is possible to keep the DHT up-to-date.

On the other hand, various content data (for example, movie, music, or the like) are distributed and saved (stored) in a plurality of participant nodes nn in the overlay network 9. For example, content data of a movie having a title of XXX is saved in the participant node n1, while content data of a movie having a title of YYY is saved in a participant node n2. In such a manner, content data which are different from each other are distributed in a plurality of participant nodes nn to be saved.

Further, certain content data are not limited to be saved in only one participant node nn and the same content data may be saved in a plurality of participant nodes nn. To each of these content data, content name (title) or the like is given.

Further, location information indicating location of the content data thus distributed to be saved (e.g. IP address of a participant node nn in which content data is saved) is also distributed among a plurality of participant nodes nn to be saved. For example, a content name of certain content data (or first a few bytes of the content data) is hashed by a hash function used in common for obtaining the node ID and a participant node nn having a node ID which is the closest (for example, matches most in the upper digits) to the hashed value (the hashed value becomes the content ID) saves location information of the content data (hereinafter referred to as "root node"). In other words, even when one of the same content data (having the same content ID) is saved in a plurality of participant nodes nn, location information indicating location of such content data (such as IP addresses of the plurality of participant nodes) can be managed by one root node (hereinafter, such a participant node which manages location of content data will be referred to as a "root node"). In the present embodiment, although location information of content data corresponding to one content ID is saved in one root node (that is, the root node and the location information have 1:1 relation), the present invention is not limited thereto.

Each participant node nn can find desired content data by the DHT.

Figure 5:
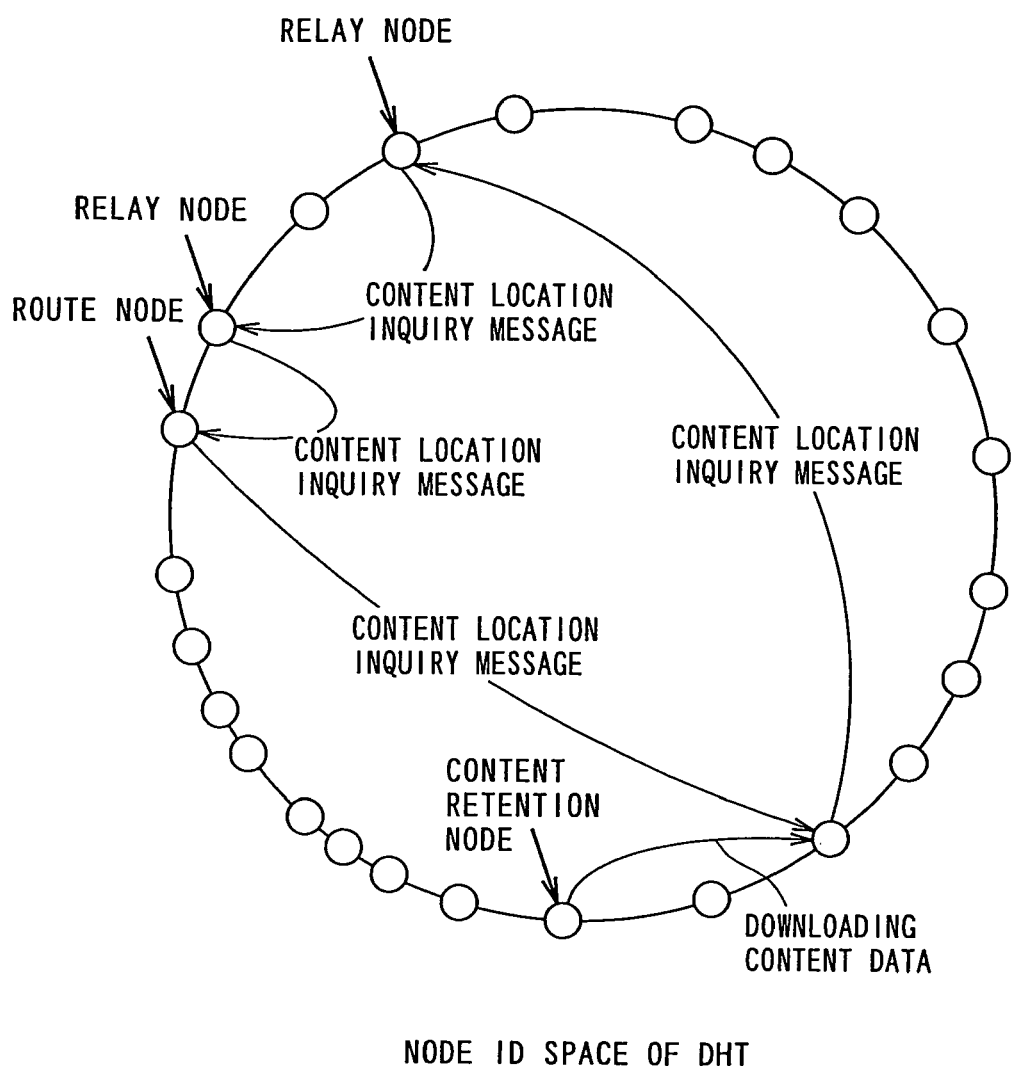
FIG. 5 is a conceptual diagram showing an example of a flow of various types of messages in the node ID space of a DHT when a participant node inquires location of content data.

FIG. 5 is a conceptual diagram showing an example of a flow of various types of messages in the node ID space of a DHT when a participant node inquires location of content data.

In the example shown in FIG. 5, a participant node used by a user who wants to download certain content data, for example, a participant node n4, transmits a content location inquiry (search) message in which a content ID of the content data is described to another participant node nn. Then, the content location inquiry (search) message, in which the content ID is described, reaches a root node saving location information indicating location of the content data after passing through several participant nodes nn (hereinafter referred to as a "relay node") (a routing table of the DHT is referred to at each relay node and the content ID is transferred). Then, it becomes possible to acquire (receive) a content location reply message including the location information from the root node, and it also becomes possible to be connected to, for example, a participant node nn saving the content data (hereinafter referred to as a "content retention node") to acquire (download) the content data therefrom on the basis of the location information thus acquired. Each relay node compares content ID described in the content location inquiry (search) message thus acquired with a node ID registered in a routing table of the own relay node, specifies a participant node nn to which the message is to be transferred next (for example, as mentioned above, specifies an IP address or the like of a participant node nn corresponding to a node ID having top several digits matched those of the content ID), and transfers the content location inquiry (search) message thereto.

Here, the participant node n4 may acquire a content location reply message from a participant node nn which caches the same location information as one the root node has before the content location inquiry (search) message reaches the root node.

Each participant node nn participating in the overlay network 9 in such a manner saves shared information used for a firmware, a software for executing various process such as transmission and reception of a message using the above-mentioned DHT (a program such as an execution module), and sharing of various types of setting files and the like. Such shared information is appropriately updated by, for example, a system operator or the like (version upgraded or updated) and saved in a participant node nn which is selected by the system operator, always participates in the overlay network 9 and has high reliability (hereinafter, referred to as a "super node" (an example of a specific node device specially selected among a plurality of participant nodes nn)).

In the present embodiment, to cause shared information which must be the same version to be spread to the entire content delivery system S (in other words, all the participant nodes nn participating in the overlay network 9) swiftly and efficiently, when each participant node nn transmits the above-mentioned arbitrary message to a participant node nn which is a connection counterpart, version number as version information indicating version of shared information the own participant node nn saves is described in the message (for example, in the header part).

Here, the version means newness of the shared information and every time the shared information is updated, version number increases (in other words, version upgraded, or updated).

The participant node nn which receives the message, in which the version number is described, compares the described version number with version number of the shared information saved by the own participant node nn. When the version number of the shared information saved by the own participant node nn is older than the version number of the shared information saved by another participant node nn, the participant node nn acquires the shared information from a participant node nn (for example, a super node) which saves shared information of a version newer than the version of the shared information saved by the own participant node nn and updates the shared information that the own participant node nn saves. Thus, information of each participant node nn can be updated quickly and assuredly without transmitting a dedicated message for coordinating shared information.

FIG. 6 is a view showing an example of content of a content location inquiry message.

Further, a content location inquiry message 51 shown in FIG. 6 includes a message header 52 and a message main body 53. In the message header 52, transmitter information of the message 52b, transfer destination information of the message 52c to 52f, transferred times 52g, and a message type 52h are described. From this message header 52, it is understood that the content location inquiry message has been transferred through participant nodes nn four times.

Further, as shown in FIG. 6, in the transmitter information of the message 52b and the transfer destination information of the message 52c to 52f, IP address, port number, node ID, version number, and internet environment evaluation value of each of the transmitter and the transfer destinations are described. The internet environment evaluation value is internet environment information indicating network connection environment and is evaluated in five-grade evaluation from A to E. For example, an effective bandwidth (transfer speed of data) for evaluation value A is 20 Mbps or more, an effective bandwidth (transfer speed of data) for evaluation value B is 10 Mbps or more, an effective bandwidth (transfer speed of data) for evaluation value C is 5 Mbps or more, an effective bandwidth (transfer speed of data) for evaluation value D is a few Mbps or more, and a dial line is used for evaluation value E. That is, from the evaluation value E to A, internet environment becomes better (faster download time). Here, in the present embodiment, effective bandwidth is taken as an example of the internet environment evaluation value. However, the present invention is not limited thereto, and for example HOP number from a fixed point or segment information of an IP address is also applicable.

Further, in the message main body 53, content ID of content data to be an inquiry target by the content location inquiry message 51 and reply request number are described.

Next, configuration and function of a participant node nn and a non-participant node nm will be explained with reference to FIG. 7.

FIG. 7 is a view showing a schematic configuration of a participant node nn and a non-participant node nm.

The participant node nn and the non-participant node nm are respectively configured by including, as shown in FIG. 7, a control unit 11 which is a computer configured by having a CPU having computing function, a RAM for work, and a ROM for storing various data and programs, a storage unit 12 as a self node version information saving means, an other node version information saving means, and a specific node version information saving means, configured by an HDD or the like for saving and retaining (storing) shared information such as various data (e.g. content data, location information, and DHT) and programs, and version number of the shared information and the like; a buffer memory 13 for temporarily storing content data received; a decoder 14 for decoding (data stretching, decrypt and otherwise) encoded video data (image information) and audio data (voice information) included in the content data; an image processing unit 15 for providing predetermined graphic processing to the decoded video data or the like and outputting the data as video signal; a display unit 16 such as CRT or liquid crystal display for displaying image on the basis of the video signal outputted from the image processing unit 15; an audio processing unit 17 for amplifying the converted signal by an amplifier and outputting this after converting the decoded audio data by digital/analog (D/A) conversion into analog audio signal; a speaker 18 for outputting the audio signal outputted from the audio processing unit 17 as acoustic wave; a communication unit 20 for carrying out communication control of information between other participant nodes nn or non-participant nodes nm via the network 8; and an input unit 21 (e.g. such as a key board, a mouse, or an operation panel) which receives instruction from a user and provides instruction signal corresponding to the instruction to the control unit 11, wherein the control unit 11, the storage unit 12, the buffer memory 13, the decoder 14, and the communication unit 20 are mutually connected via a bus 22.

In such the configuration, when CPU in the control unit 11 reads out and performs a program (including a shared information update process program of the present invention) saved in the storage unit 12 or the like, the control unit 11 of the participant node n1 controls the whole system, and at the same time functions as a data transmission means, a data transfer means, a data receiving means, a version judgment means, a shared information update means, a reference means, a specific identification information judgment means, and the like to carry out later-described various process according to the present invention.

Here, for example, the shared information update process program may be downloaded from a predetermined server on the network 8 or may be recorded in a memory medium such as a CD-ROM and read out through a drive of the memory device.

[2. Operation of Content Delivery System]

Next, operation of the content delivery system S in updating the shared information will be described with reference to FIGS. 8 to 10.

Figure 8:
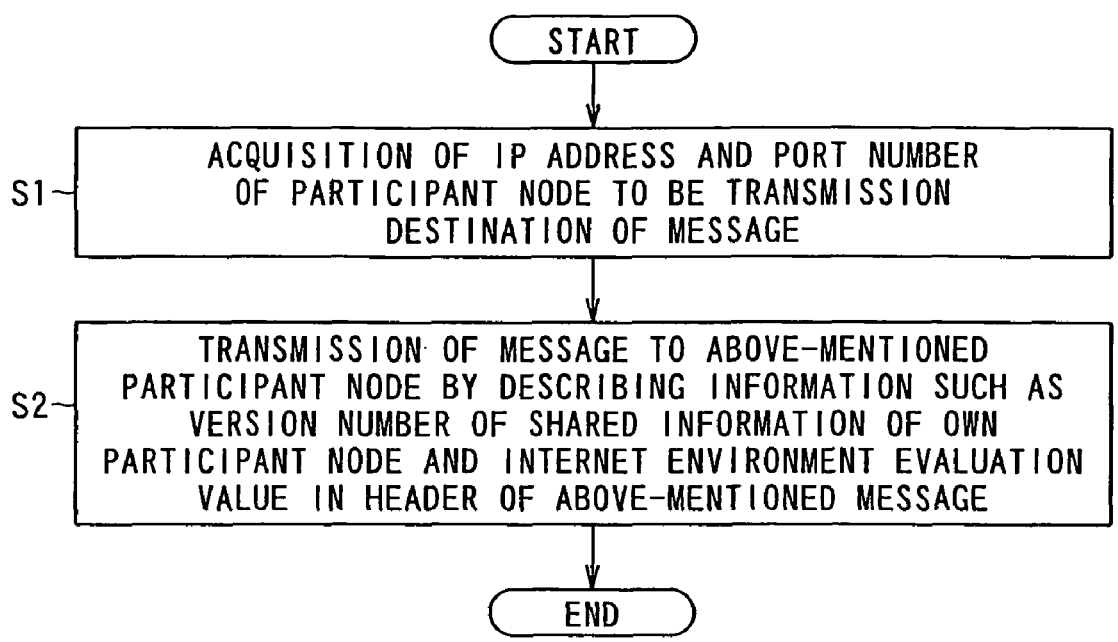
FIG. 8 is a flowchart showing process in a control unit 11 of the participant node nn which is a transmitter of a message.
Figure 9:
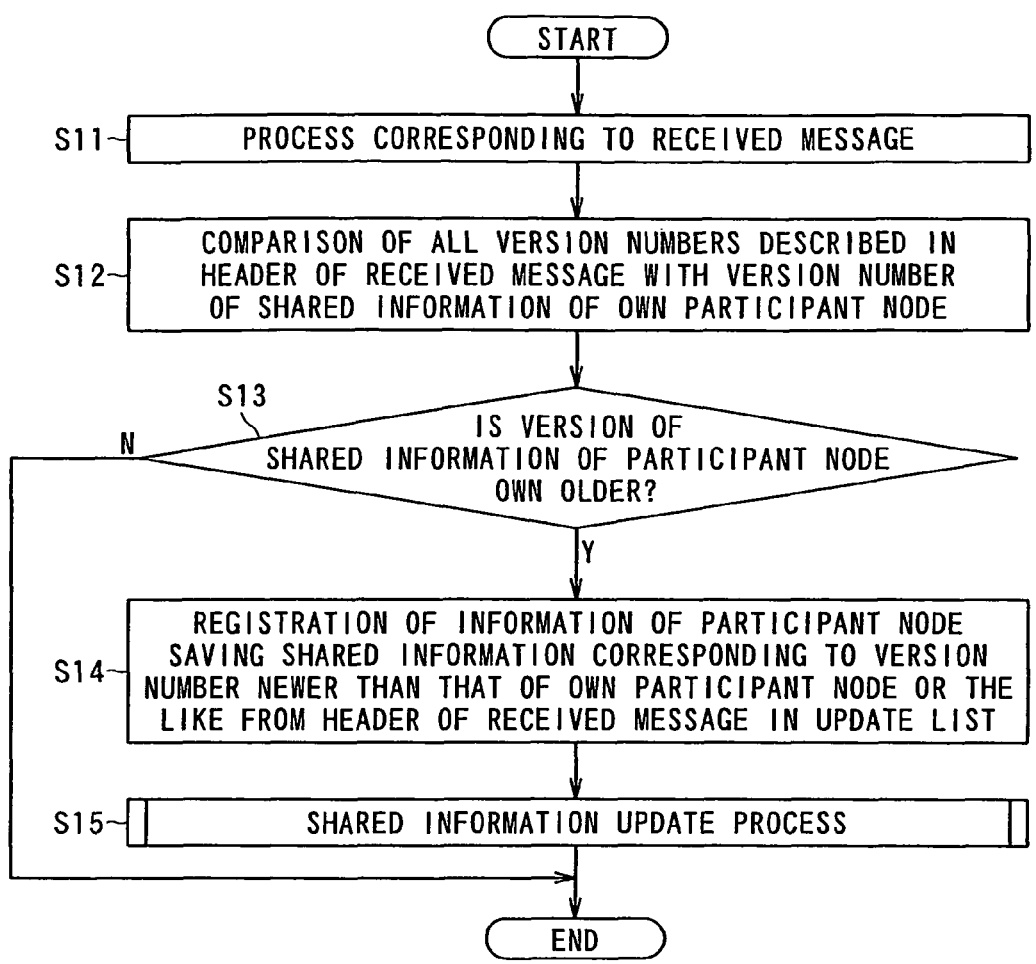
FIG. 9 is a flowchart showing process in a control unit 11 of the participant node nn which receives the message.
Figure 10:
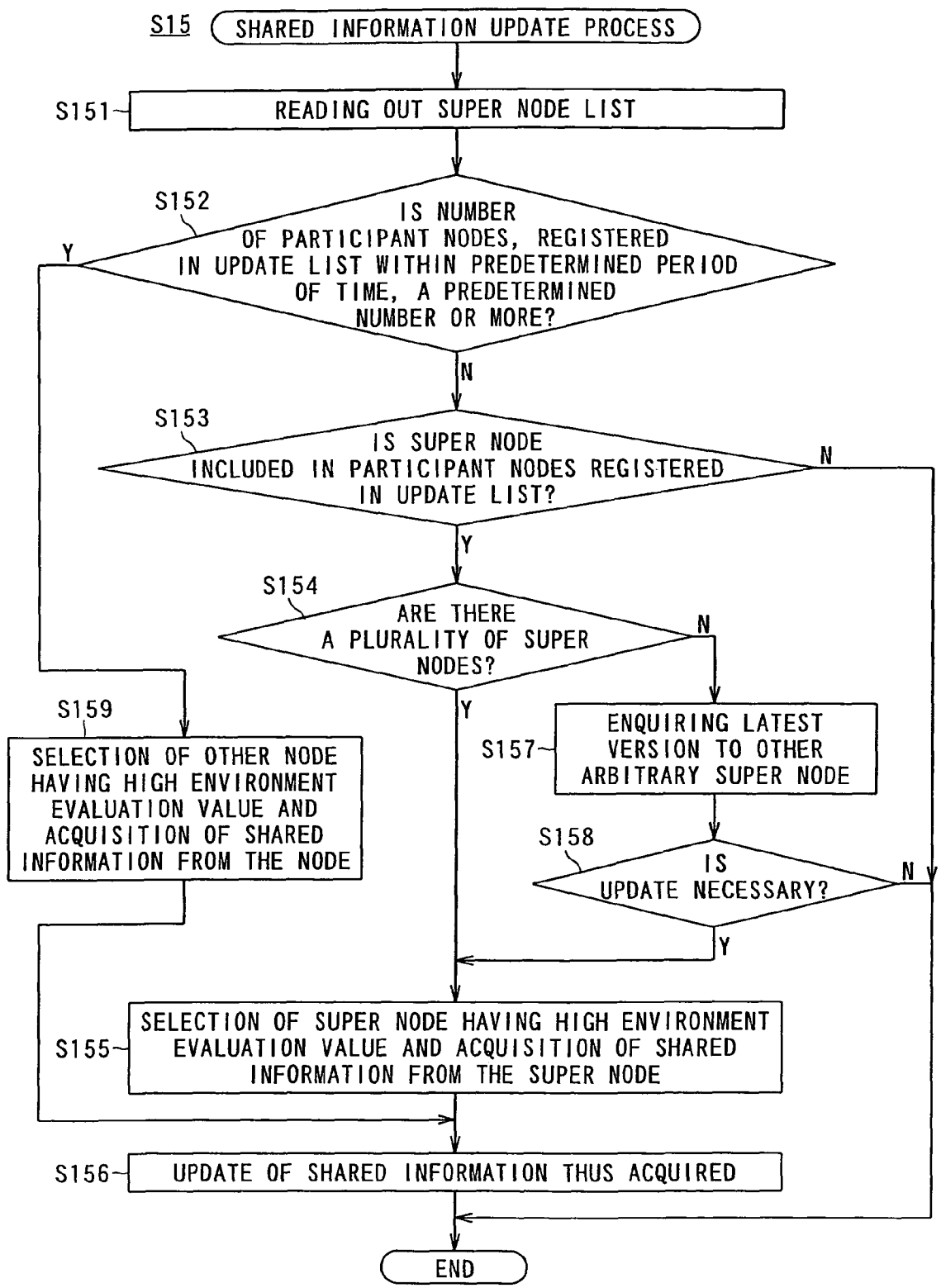
FIG. 10 is a flowchart showing details of shared information update process in Step S15 shown in FIG. 9.

FIG. 8 is a flowchart showing process in a control unit 11 of the participant node nn which is a transmitter of a message, FIG. 9 is a flowchart showing process in the control unit 11 of the participant node nn which receives the message, and FIG. 10 is a flowchart showing details of shared information update process in Step S15 of FIG. 9.

Process shown in FIG. 8 is started by for example content request operation from the input unit 21 by a user (for example, a user specifies a title of desired content from a content list). In Step S1, the control unit 11 of a participant node nn refers to a routing table of the own participant node, specifies a participant node nn having a node ID closest to the content ID of the content data thus specified (for example, one whose top digits match the most with the content ID) as a transmission destination of the content location inquiry message, and acquires the IP address and port number thereof.

Next, in Step S2, the control unit 11 describes the IP address, the port number, the node ID, version number of shared information, and internet environment evaluation value (for example, saved in the storage unit 12 in advance) of the own participant node nn in the header of the content location inquiry message, describes the content ID or the like in the message main body, and transmits the content location inquiry message to the participant node nn whose IP address and port number is thus acquired through the network 8 or the like as the data transmission means. Then the process ends.

Here, each version number of a plurality of types of shared information such as various programs, setting files, and the like may be described in the header. For example, a version number of a firmware may be "FW-VX (a variable indicative of a version)", a version number of an application software may be "AP-VX (a variable indicative of a version)", a version number of a setting file may be "ST-VX (a variable indicative of a version)" and every time version is upgraded or updated, VX is set up to independently increase like 1, 2, 3, . . . with respect to each type (e.g. FW-1024→FW-1025→FW-1026, AP-501→AP-502→AP-503, and ST-7→ST-8).

Here, the version number of shared information to be described in the header can be arbitrarily determined, and the version numbers of a plurality of shared information may be listed up. How to describe the version number is defined by the system in advance.

Next, a process shown in FIG. 9 is started when the control unit 11 of the participant node nn receives a message from another participant node nn as a data receiving means. In Step S11, process in response to a received message is carried out.

For example, in a case where the message is a content location inquiry message, the control unit 11 refers to a routing table of the own participant node nn and judges whether or not there is a transfer destination of the message. When there is no transfer destination of the message, for example, node ID of the own participant node nn is closest (e.g. top digits of the content ID match most) to a content ID, described in the message main body (that is, the own participant node nn is a root node of the content data), the control unit 11 describes the IP address, the port number, the node ID, version number of shared information, and internet environment evaluation value, respectively of the own participant node nn, in the header of the content location inquiry message and transmits the message to a participant node nn being a sender of the content location inquiry message.

On the other hand, in a case where there is a transfer destination of the message, for example, in a case where another participant node nn has a node ID closest to the content ID described in the message main body (e.g. top digits of the content ID match most), the control unit 11 specifies the another participant node nn as a transfer destination of the content location inquiry message and acquires the IP address and the port number from the routing table of DHT. Then, the control unit 11 describes the IP address, the port number, the node ID, a version number of shared information, and an internet environment evaluation value, respectively of the own participant node nn in the header of the content location inquiry message and transmits the content location inquiry message to the participant node nn corresponding to the IP address and port number thus acquired through the network 8 or the like, as the data transfer means.

Here, when the message is a participation request message and is transferred to another participant node nn, the IP address, the port number, the node ID, a version number of shared information, an internet environment evaluation value and the like, respectively of the own participant node nn are described in the header of the participation request message.

Next, in Step S12, the control unit 11 compares all the version numbers described in the header of the message thus received (e.g. all the version numbers included in sender's information of the message 52b and information 52c to 52f on the transfer destination of the message) with the version number of shared information saved by the own participant node nn (e.g. values of variable VX indicative of the version are compared for each shared information type, and it is recognized that the variable having a larger value is newer).

Then, the control unit 11 judges whether or not the version of the shared information saved by the own participant node nn is older than the version of the shared information, saved by another participant node nn, as the version judgment means (Step S13). In a case where the version of the shared information saved by the own participant node nn is older (Step S13: Y), that is, when there is shared information of an older version in the shared information saved by the own participant node nn, the process moves to Step S14. Here, when each version number of a plurality of types of shared information are described in the header, the version numbers are compared with respect to each of all the shared information, and in a case where there is at least one of the older version, the process moves to Step S14.

On the other hand, in a case where the version of the shared information saved by the own participant node nn is not older (Step S13: N), that is, there is no older version shared information in the shared information saved by the own participant node nn, the process ends.

Next, in Step S14, information of a participant node nn saving shared information of a version newer than the version of the shared information of the own participant node nn (e.g. the IP address, the port number, the node ID, a version number of the shared information, and an internet environment evaluation value) is extracted from the header of the message thus received and saved in an update list in correspondence with a time when the message is received. Here, it is possible to register only information of a participant node nn extracted from a message, received within a predetermined period of time in the past (e.g. within last 24 hours) in the update list (e.g. information of the participant node nn existing before the latest 24 hours is deleted in this Step S14).

Here, in a case where version numbers of each of a plurality of types of the shared information are described in the header, information of a participant node nn saving shared information corresponding to each version number (limited only to newer version numbers than the version number of shared information, saved by the own participant node nn) is registered in the update list with respect to each shared information.

Next, the control unit 11 carries out a shared information update process (Step S15).

In the shared information update process, as shown in FIG. 10, the control unit 11 first reads out a super node list from the storage unit 12 (Step S151). Such the super node list is acquired from another arbitrary participant node nn when participating in the overlay network 9. IP addresses, port numbers, node IDs, version numbers of shared information, internet environment evaluation values, and the like of the above-mentioned super nodes are described in the list.

Next, the control unit 11 refers to the update list, judges whether a predetermined number (e.g. 15) or more of participant nodes nn is registered in the update list within a predetermined period of time (e.g. last 24 hours) (when there are a plurality of types of shared information, judgment is made for each shared information). In a case where a predetermined number of participant nodes nn is not registered (Step S152: N), the process goes to Step S153.

Here, by setting up the "predetermined number" to a certain number or more, it becomes possible to prevent the system from being infected by a file such as a virus of breaking a system by an ill-minded user, whereby security of the system can be improved. On the other hand, in a case where the predetermined number or more of the participant nodes nn is registered in the update list (Step S152: Y), the control unit 11 as the shared information update means refers to the update list, determines another participant node nn, from which shared information is to be acquired (here, a participant node nn other than a super node) on the basis of the internet environment evaluation value (this enables to prevent concentration of access to a super node), selects a participant node nn having a high environment evaluation value (closer to "A") (selecting not only an effective bandwidth (transfer speed of data), but also HOP number from a fixed point or each of segment information of IP address, or combination thereof, a device and an optimum participant node nn from which shared information is to be acquired), is connected to the participant node nn thus selected by acquiring the IP address or the like of the participant node nn, and acquires (downloads) the latest version (Step S159). Then, the process goes to Step S156.

In Step S153, the control unit 11 judges whether or not a super node is included in the participant nodes nn, registered in the update list. That is, it is judged by the control unit 11 as the specific identification information judgment means whether or not a node ID (a node ID described in the received message) as identification information registered in the update list matches a node ID as specific identification information registered (saved) in the super node list.

In a case where version numbers of a plurality of types of shared information are described in the update list, it is judged whether or not a super node is included with respect to each shared information.

In a case where, the super node is included (Step S153: Y), the process goes to Step S154. In a case where the super node is not included (Step S153: N), the process ends.

In Step S154, the control unit 11 judges whether or not there are a plurality of super nodes (when there are a plurality of types of shared information, judgment is made for each shared information). In a case where there are a plurality of super nodes (Step S154: Y), the process goes to Step S155. In a case where there are not a plurality of super nodes (Step S154: N), the process goes to Step S157.

In Step S155, the control unit 11 as the shared information update means refers to the update list or the super node list, determines a participant node nn from which the shared information is acquired on the basis of the internet environment evaluation value, selects for example a super node having a high environment evaluation value (closer to "A") (selecting a device and an optimum participant node nn from which shared information is to be acquired in reference of not only an effective bandwidth (transfer speed of data), but a HOP number from a fixed point or each of segment information of IP address, or combination thereof), is connected to the super node thus selected by acquiring the IP address or the like of the super node, and acquires (downloads) the latest version (Step S159). Then, the process goes to Step S156. Though the super node is selected in the Step S155, an ordinary participant node nn other than a super node may be selected. However, the selection of a super node enables to prevent false shared information from being distributed in a stage where new shared information begins to increase.

In Step S157, the control unit 11 arbitrarily selects another super node from the super node list (a super node not registered in the update list), is connected to the super node thus selected by acquiring the IP address or the like of the super node, and refers to the latest version as the reference means.

Then, the control unit 11 judges whether or not to update shared information, saved by the own participant node nn (Step S158). For example, the control unit 11 compares a version number corresponding to a super node registered in the update list and a version number corresponding to the another super node referred to in Step S157 and judges whether or not the numbers are the same. When it is judged that the numbers are the same, it is judged that update is to be performed (Step S158:Y). That is, in a case where the version of shared information saved by the super node, registered in the update list, and the version of the latest version thus referred to are the same, the process goes to Step S155, and a process similar to the above is carried out. When the update is not to be carried out (Stop S158: N), the process ends.

Here, in a case where version numbers of each of a plurality of types of shared information is described in the update list, it is judged whether or not to update for each shared information.

In Step S156, the control unit 11 updates the shared information thus saved using the shared information thus acquired, and resets the update list. Then the process ends.

As explained above, according to the present embodiment, in a case where each participant node nn transmits various types of messages to a participant node nn, which is a connection counter part, the version number as version information indicative of a version of shared information that the own participant node nn saves is described in the message (e.g. the header). The participant node nn that receives the message having its version number described in it compares the version number thus described with a version number of shared information saved by the own participant node nn. When the version of shared information, saved by the own participant node nn, is older than the version of shared information saved by another participant node nn, the participant node nn acquires the shared information from a participant node nn saving shared information of newer version (e.g. from a super node) and updates shared information, saved by the own participant node nn. Therefore, without imposing excessive loads to a specific device such as a server, shared information between each participant node nn can be quickly and assuredly updated.

Further, only in a case where it is judged that the version of shared information saved by the own participant node nn is older than the version of shared information, saved by a predetermined number or more of node devices of a plurality of the other participant nodes nn, shared information saved by the participant node nn is updated. Therefore, it is possible to easily prevent cracking or the like and to improve reliability (enhance security). Further, it is easily confirmed whether or not a participant node nn, being a connection counterpart directly maintaining communication session with the participant node nn, and a version number specified therefrom are throughly trustworthy. Therefore, it becomes possible to prevent cracking of the system and flow of information and the like.

Further, in a case where it is judged that the version of shared information saved by the own participant node nn is old, the latest version of shared information is referred to by consulting the super node especially selected from among a plurality of participant nodes nn. Therefore, enhancement of security can be further expected.

Furthermore, by the process shown in FIG. 10, at the first stage of increasing the new shared information, only the super node possesses the shared information of new version and a participant node nn which has happened to exchange a message with the super node starts to acquire the new shared information. An increment rate of the new shared information is slow in this stage. However, it is possible to obtain an effect of exponentially spreading at once the shared information of the new version at a stage where a number of participant nodes nn having the shared information of the new version exceeds a certain number.

Here, in the present embodiment, it is judged whether or not there are a plurality of super nodes in Step S154. However, the number may be predetermined. For example, the predetermined number may be 1, or 3 and more.

Further, in the present embodiment, when it is judged that the version of the shared information saved by the own participant node nn is old in Step S13 (Step S13:Y), information of a participant node nn saving new version of the shared information is registered in the update list in Step S14. However, instead of registering in the update list, the control unit 11 may judge whether or not a predetermined number or more (this may be 1 or 2 and more) of participant node nn, saving the shared information of the new version, exist in the received message header, and in a case where there are a predetermined number or more, the shared information may be updated.

Further, in the present embodiment, the plurality of super nodes are configured to have the shared information of new version from the start. As another example, an operator of the system may arbitrarily select a predetermined number of participant nodes nn and push (forcibly sending) the new shared information to the participant nodes nn (in this case, the super node and the process regarding the super node in FIG. 10 become unnecessary).

Further, in the present embodiment, the version number of the shared information is described in the header of message. However, the present invention is not limited thereto, and the version number may be described in a message main body or in a footer.

The above embodiments has been described on the premise that the overlay network 9 is constructed by the algorithm using a DHT. However, the present invention is not limited thereto.

The present invention is not confined to the configuration listed in the foregoing embodiments, but it is easily understood that the person skilled in art can modify such configuration into various other modes, within scope of the present invention described in the claims.

Further, all the disclosure in Japanese Patent Application (No. 2005-239532) filed in Aug. 22, 2005, including specification, claims, figures, and abstract, is incorporated herein by reference.

The invention claimed is:

1. A node device in an information sharing system including a plurality of node devices mutually connectable through a network, the plurality of node devices saving shared information which is used in common with the plurality of node devices, the node device transmits predetermined data to other node devices, the node device comprising:
   a first version information saving unit that saves version information indicative of a version of shared information saved by the node device;
   a data transmission unit that transmits data and version information corresponding to the transmitted data to the other node devices;

a data receiving unit that receives the data and version information which are transmitted from one of the plurality of node devices;

a first version judgment unit that judges whether the version information saved in the first version information saving unit is older than the version information received by the data receiving unit;

a second version information saving unit that saves the version information received by the data receiving unit, in response to the first version judgment unit judging that the version information saved in the first version information saving unit is older than the version information received by the data receiving unit;

wherein the second version information saving unit contains a predetermined number; and wherein the predetermined number represents a number of times the first version judgment unit has determined the version information saved in the first version information saving unit is older than the version information received by the data receiving unit, wherein the version information received is transmitted by a different one of the plurality node devices;

a second version judgment unit that judges whether the number of version information saved in the second version information saving unit reaches the predetermined number, wherein the predetermined number is two or more, and a shared information update unit that updates the shared information saved in the first version information saving unit to a new version shared information, in response to the second version judgment unit judging the number of version information saved in the second version information saving unit reaches the predetermined number.

2. The node device according to claim 1, wherein the data transmission unit describes the version information, saved in the first version information saving unit, and transmitting the data to the other node devices.

3. The node device according to claim 2, further comprising:

a reference unit that refers to a latest version of the shared information to a specific node device, selected from the plurality of node devices;

wherein the shared information update unit acquires the shared information from the other node device, saving the shared information of the latest version, and updates the shared information, saved by the node device to the shared information of the latest version.

4. The node device according to claim 2, wherein the data transmission unit describes network environment information indicative of network connection environment of the node device; and the shared information update unit determines the node device, from which the shared information is to be acquired, on the basis of the network environment information of the plurality of other node devices, acquires the shared information from the node device thus determined, and updates the shared information saved by the node device.

5. The node device according to claim 1, wherein the data are relayed through at least one of the plurality of node devices, and the version information respectively of the shared information saved by the node device of sending the data and a second node device relaying the data is described in the data, the version judgment unit compares the plurality of version information, described in the one data thus received, with the version information saved by the node device and judges whether or not the version of shared information saved by the node device is older than the version of shared information saved by a plurality of the other node devices; and the shared information update unit acquires the shared information from the other node device saving the shared information of the newer version than the version, saved by the node device, and updates the shared information saved by the own node device in a case where it is judged that the number of the version information saved by the second version information saving unit, where the version information saved by the first version information saving unit is older than the version information saved by the second version information saving unit, reach the predetermined number.

6. The node device according to claim 5, further comprising:

a reference unit that refers to a latest version of the shared information to a specific node device, selected from the plurality of node devices;

wherein the shared information update unit acquires the shared information from the other node device, saving the shared information of the latest version, and updates the shared information, saved by the node device, to the shared information of the latest version.

7. The node device according to claim 1, further comprising:

a reference unit that refers to a latest version of the shared information to a specific node device, selected from the plurality of node devices in response to judging that the number of version information saved in the second version information saving unit reaches the predetermined number, wherein the shared information update unit acquires the shared information from the other node device saving the shared information of the latest version, and updates the shared information saved by the node device in response to judging that the version of shared information saved by the node device is older than the latest version.

8. The node device according to claim 1, further comprising:

a specific node saving unit that saves specific identification information of a specific node device; and a specific identification information judgment unit that judges whether the identification information, described in the received data, matches the specific identification information saved in the specific node saving unit;

wherein the shared information update unit acquires shared information from the other node device saving shared information of a version newer than the version of shared information saved by the node device, and updates the shared information saved by the node device, in response to judging that the identification information described in the received data matches the specific identification information, and the version of the shared information saved by the node device is older than version information saved by the specific node device indicated by the specific identification information.

9. The node device according to claim 1, wherein the data transmission unit describes the network environment information indicative of network connection environment of the node device; and the shared information update unit determines the node device, from which the shared information is to be acquired, on the basis of the network environment information of the plurality of other node devices, acquires the shared information from the node device thus determined, and updates the shared information saved by the node device.

10. The node device according to claim 1, further comprising:
a reference unit that refers to a latest version of the shared information to a specific node device, selected from the plurality of node devices;
wherein the shared information update unit acquires the shared information from the other node device, saving the shared information of the latest version, and updates the shared information, saved by the node device to the shared information of the latest version.

11. A non-transitory computer-readable storage medium that stores a computer-executable program for a node device in an information sharing system, including a plurality of node devices mutually connectable through a network, the plurality of node devices saving the shared information in common with the plurality of node devices, the node device transmits predetermined data to other node devices, the medium being installed in each node device, the program comprising:
instructions for saving version information, in a first version information saving unit, indicative of a version of shared information saved by the node device;
instructions for transmitting data and version information corresponding to the transmitted data to the other node devices;
instructions for receiving the data and version information which are transmitted from one of the plurality of node devices;
instructions for judging whether the version information saved in the first version information saying unit is older than the version information received by the data receiving unit;
instructions for saving the version information received by the data receiving unit in a second version information saving unit, in response to judging that the version information saved in the first version information saving unit is older than the version information received by the data receiving unit;
wherein the second version information saving unit contains a predetermined number; and wherein the predetermined number represents a number of times the first version judgment unit has determined the version information saved in the first version information saving unit is older than the version information received by the data receiving unit, wherein the version information received is transmitted by a different one of the plurality node devices;
instructions for judging whether the number of version information saved in the second version information saving unit reaches the predetermined number, wherein the predetermined number is two or more, and
instructions for updating the shared information saved in the first version information saving unit to a new version shared information, in response to the judging the number of version information saved in the second version information saving unit reaches the predetermined number.

12. A shared information update method performed by a node device in an information sharing system including a plurality of node devices, mutually connectable through a network, the plurality of node devices saving shared information in common with the plurality of node devices, the node device transmits predetermined data to the other node devices, the method comprising steps of:
saving, in a first version information saving unit, version information indicative of a version of the shared information saved by the node device;
transmitting data and version information corresponding to the transmitted data to the other node devices;
receiving data and version information which are transmitted from one of the plurality of node devices;
judging whether the version information saved in the first version information saving unit is older than the version information received by the data receiving unit;
saving, in a second version information saving unit, the version information received by the data receiving unit, in response to judging that the version information saved in the first version information saving unit is older than the version information received by the data receiving unit;
wherein the second version information saving unit contains a predetermined number; and wherein the predetermined number represents a number of times the first version judgment unit has determined the version information saved in the first version information saving unit is older than the version information received by the data receiving unit, wherein the version information received is transmitted by a different one of the plurality node devices;
judging whether the number of version information saved in the second version information saving unit reaches a predetermined number, wherein the predetermined number is two or more, and
updating the shared information saved in the first version information saving unit to a new version shared information, in response to judging the number of version information saved in the second version information saving unit reaches the predetermined number.

13. An information sharing system including a plurality of node devices, mutually connectable through a network, the plurality of node devices saving shared information which is used in common with the plurality of node devices, a node device transmits predetermined data to other node devices, the node device comprising:
a first version information saving unit that saves version information indicative of a version of the shared information saved by the node device;
a data transmission unit that transmits data and version information corresponding to the transmitted data to the other node devices;
a data receiving unit that receives data and version information which are transmitted from one of the plurality of node devices;
a first version judgment unit that judges whether the version information saved in the first version information saving unit is older than the version information received by the data receiving unit;
a second version information saving unit that saves the version information received by the data receiving unit, in response to the first version judgment unit judging that the version information saved in the first version information is older than the version information received by the data receiving unit;
wherein the second version information saving unit contains a predetermined number; and wherein the predetermined number represents a number of times the first version judgment unit has determined the version information saved in the first version information saving unit is older than the version information received by the data receiving unit, wherein the version information received is transmitted by a different one of the plurality node devices;

a second version judgment unit that judges whether the number of version information saved in the second version information saving unit reaches the predetermined number, wherein the predetermined number is two or more, and a shared information update unit that updates the shared information saved in the first version information saving unit to a new version shared information, in response to the second version judgment unit judging the number of version information saved in the second version information saving unit reaches the predetermined number.

* * * * *